United States Patent
Herrnberger et al.

(10) Patent No.: US 12,031,515 B2
(45) Date of Patent: Jul. 9, 2024

(54) METHOD AND DEVICE FOR CLOSED-LOOP CONTROL OF THE TEMPERATURE OF A COMPONENT IN AN EXHAUST TRACT OF AN INTERNAL COMBUSTION ENGINE BY A PREDICTOR

(71) Applicant: Vitesco Technologies GmbH, Regensburg (DE)

(72) Inventors: Michael Herrnberger, Straubing (DE); Alexander Zimmerer, Rottenburg (DE)

(73) Assignee: Vlitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/666,012

(22) Filed: Feb. 7, 2022

(65) Prior Publication Data
US 2022/0154681 A1 May 19, 2022

Related U.S. Application Data

(63) Continuation of application No. PCT/EP2020/071592, filed on Jul. 30, 2020.

(30) Foreign Application Priority Data

Aug. 6, 2019 (DE) ...................... 10 2019 211 803.8

(51) Int. Cl.
*F02P 5/15* (2006.01)
*F01N 9/00* (2006.01)

(52) U.S. Cl.
CPC .............. *F02P 5/1502* (2013.01); *F01N 9/00* (2013.01); *F01N 2430/08* (2013.01);
(Continued)

(58) Field of Classification Search
CPC ...... F02P 5/1502; F01N 9/00; F01N 2430/08; F01N 2900/0408; F01N 2900/08;
(Continued)

(56) References Cited

U.S. PATENT DOCUMENTS 5,544,639 A    8/1996   Shouda
5,647,669 A    7/1997   Schneider
(Continued)

FOREIGN PATENT DOCUMENTS

DE    4430979 A1    3/1995
DE    4424811 A1    1/1996
(Continued)

OTHER PUBLICATIONS

International Search Report and Written Opinion dated Sep. 28, 2020 from corresponding International Patent Application No. PCT/EP2020/071592.
(Continued)

*Primary Examiner* — Brandon D Lee

(57) ABSTRACT

The disclosure provides a method and a device for closed-loop control of a temperature of a component in an exhaust-gas tract of an internal combustion engine. The exhaust-gas tract has a temperature sensor arranged upstream of the component. The method includes providing a control circuit for the closed-loop control of the temperature of the component and detecting a measurement signal by the temperature sensor during the operation of the internal combustion engine. The measurement signal is characteristic of an exhaust-gas temperature. The measurement signal is used as a measured controlled variable for the control circuit for the closed-loop control of the temperature of the component. The method also includes determining a temperature model for the exhaust-gas temperature of the exhaust gas upstream of the component. The temperature model is used as a predictor for the control circuit. Also, a modeled controlled variable is provided from the temperature model.

14 Claims, 1 Drawing Sheet

(52) U.S. Cl.
CPC .. *F01N 2900/0408* (2013.01); *F01N 2900/08* (2013.01); *F01N 2900/12* (2013.01); *F01N 2900/1602* (2013.01)

(58) Field of Classification Search
CPC ......... F01N 2900/12; F01N 2900/1602; F01N 2900/1404; F01N 3/023; F01N 3/2006; F01N 2430/00; F01N 2560/06; F01N 2900/1411; Y02T 10/40
See application file for complete search history.

(56) References Cited

U.S. PATENT DOCUMENTS

| | | | |
|---|---|---|---|
| 2004/0013165 A1 | 1/2004 | Plote | |
| 2005/0241301 A1* | 11/2005 | Okugawa | F01N 9/002 60/285 |
| 2009/0164088 A1 | 6/2009 | Haft | |
| 2010/0043404 A1 | 2/2010 | Hebbale | |
| 2010/0050607 A1* | 3/2010 | He | F01N 3/035 60/274 |
| 2016/0090077 A1* | 3/2016 | Choi | B60W 10/02 701/22 |
| 2016/0332631 A1* | 11/2016 | Roos | B60W 30/18136 |
| 2018/0180016 A1* | 6/2018 | Nose | F02D 41/3005 |
| 2019/0092314 A1* | 3/2019 | Goek | B60K 6/12 |
| 2021/0332768 A1* | 10/2021 | Damitz | F02D 41/1401 |

FOREIGN PATENT DOCUMENTS

| | | |
|---|---|---|
| DE | 10108181 A1 | 8/2002 |
| DE | 102006007417 A1 | 8/2007 |
| DE | 102009038110 A1 | 4/2010 |
| DE | 102010001208 A1 | 7/2011 |
| DE | 102016213147 A1 | 1/2018 |
| DE | 102017212909 A1 | 1/2019 |
| KR | 20020089507 A | 11/2002 |
| KR | 20190013533 A | 2/2019 |
| KR | 20190026027 A | 3/2019 |

OTHER PUBLICATIONS

German Office Action dated Jun. 17, 2020 for corresponding German Patent Application No. 10 2019 211 803.8.
Chinese Office Action dated Dec. 1, 2023 for corresponding Patent Application No. 202080054939.X.

* cited by examiner

METHOD AND DEVICE FOR CLOSED-LOOP CONTROL OF THE TEMPERATURE OF A COMPONENT IN AN EXHAUST TRACT OF AN INTERNAL COMBUSTION ENGINE BY A PREDICTOR

CROSS-REFERENCE TO RELATED APPLICATIONS

This application claims the benefit of PCT Application PCT/EP2020/071592, filed Jul. 30, 2020, which claims priority to German Application 10 2019 211 803.8, filed Aug. 6, 2019. The disclosures of the above applications are incorporated herein by reference.

TECHNICAL FIELD

The disclosure relates to a method and a device for closed-loop control of a temperature of a component in an exhaust-gas tract of an internal combustion engine. The exhaust-gas tract has a temperature sensor arranged upstream of the component in the exhaust-gas tract and a control circuit with a predictor used for the closed-loop control of the temperature of the component.

BACKGROUND

The exhaust-gas tract of an internal combustion engine is designed to conduct the exhaust gas away from the internal combustion engine. Furthermore, in modern internal combustion engines, the exhaust-gas tract is designed to remove or reduce pollutants from the exhaust gas of the internal combustion engine. In this regard, the exhaust-gas tract has, for example, an exhaust-gas catalytic converter which binds the pollutants in the exhaust-gas catalytic converter by a chemical conversion through oxidation or reduction. In addition, the exhaust-gas tract may have a particle filter for filtering particles. During the operation of the internal combustion engine, the particle filter filters particles that form during the combustion of a fuel in the internal combustion engine out of the exhaust gas, and thus reduces the number of particles that are emitted into the environment.

The required operating temperature for components in the exhaust-gas tract, for example for the exhaust-gas catalytic converter or the exhaust-gas particle filter, which are provided for reducing/filtering the pollutants/particles out of the exhaust gas of the internal combustion engine, is different. The required operating temperature for a conventional exhaust-gas catalytic converter lies for example in a range of ≥200° C., because the exhaust gas catalysis performed in the exhaust-gas catalytic converter requires a certain minimum temperature for effective aftertreatment.

The closed-loop control of the temperature of the components in the exhaust-gas tract is conventionally performed by a temperature sensor which is arranged upstream or downstream of the respective components. For this purpose, a measurement signal detected by the temperature sensor, which measurement signal is characteristic of the temperature of the exhaust gas in the exhaust-gas tract at the respective position of the temperature sensor, is transmitted as an input variable to a controller, from which input variable the parameters of the internal combustion engine are set by the controller to attain the desired temperature of the corresponding components in the exhaust-gas tract as quickly as possible.

Due to the delay times of such a control system and the relatively long heating phases of components in the exhaust-gas tract, for example of the exhaust-gas catalytic converter, conventional control systems must be set to be very conservative/sluggish/cautious. Such a setting of the control system has the result that the control is not optimal and that the control system cannot react optimally when manipulated variables arise.

Therefore, it is desirable to create a method and a device with which reliable closed-loop control of a temperature of a component in an exhaust-gas tract of an internal combustion engine is possible.

SUMMARY

One aspect of the disclosure provides a method for closed-loop control of a temperature of a component in an exhaust-gas tract of an internal combustion engine. The exhaust-gas tract has a temperature sensor arranged upstream of the component in the exhaust-gas tract. The method includes providing a control circuit for the closed-loop control of the temperature of the component; and detecting a measurement signal by the temperature sensor during the operation of the internal combustion engine. The measurement signal is characteristic of an exhaust-gas temperature of an exhaust gas upstream of the component The measurement signal is used as a measured controlled variable for the control circuit for the closed-loop control of the component for the closed-loop control of the temperature of the component. The method also includes providing a temperature model for the exhaust-gas temperature of the exhaust gas upstream of the component. The temperature model is used as a predictor for the control circuit. The temperature model provides a modeled controlled variable. The method also includes setting a manipulated variable of the control circuit for the closed-loop control of the temperature of the component based on the modeled controlled variable and of the measured controlled variable.

Implementations of the disclosure may include one or more of the following optional features. In some implementations, the internal combustion engine may be a gasoline-powered or a diesel-powered internal combustion engine. In some examples, the internal combustion engine is operated with other fuels. The exhaust-gas tract of the internal combustion engine is designed to conduct the exhaust gas of the internal combustion engine away from the internal combustion engine. Accordingly, the exhaust gas of the internal combustion engine flows into the exhaust-gas tract at an inlet region and flows out at an outlet region. Different components may be arranged in the exhaust-gas tract between the inlet region and the outlet region. The components serve, for example, for treating the exhaust gas and thus reducing or filtering pollutants out of the exhaust gas. In some implementations, the temperature sensor is arranged upstream of the component in the exhaust-gas tract. This means that an exhaust gas packet which flows through the exhaust-gas tract from the internal combustion engine flows firstly past the temperature sensor and then past or through the component. The control circuit may be a self-contained operating sequence for influencing a physical variable in a technical process. In the present case, the control circuit is used to set the temperature of the component in the exhaust-gas tract of the internal combustion engine. Accordingly, the temperature sensor is used to detect the measurement signal which is characteristic of the exhaust-gas temperature of the exhaust gas upstream of the component, correspondingly at the position of the temperature sensor in the exhaust-gas tract. In some examples, the measurement signal may, for example, be the exhaust-gas temperature directly, or another variable which is characteristic of the exhaust-gas temperature of the exhaust gas. The measurement signal of the temperature sensor may be used as the measured control variable for the control circuit for the closed-loop control of the temperature of the component. The measurement signal is accordingly input into the control circuit.

In addition, in some implementation, a temperature model for the exhaust-gas temperature of the exhaust gas upstream of the component is provided. The temperature model may include one or more characteristic maps which, in accordance with input parameters, provide(s) corresponding output parameters for the exhaust-gas temperature of the exhaust gas upstream of the component. The temperature model is thus used as a predictor for the control circuit. The temperature model uses the models/calculations stored therein in order, as a predictor, to output a prediction for future controlled variable profiles based on input parameters that are input into the temperature model. In some examples, the temperature model provides the modeled controlled variable. The modeled controlled variable accordingly includes the predictions from the temperature model and the associated corresponding input parameters.

In some examples, the modeled controlled variable and the measured controlled variable are used to set the manipulated variable of the control circuit for the closed-loop control of the temperature of the component. In other words, the information of the modeled controlled variable and of the measured controlled variable are incorporated into the manipulated variable. Accordingly, both the predictions from the temperature model as a predictor, and the presently prevailing information from the temperature sensor as a measured control variable, are incorporated into the manipulated variable. In this way, altogether faster and better adaptation of the manipulated variable is possible for the desired closed-loop control of the temperature of the component. The modeled controlled variable contains information regarding an expected exhaust-gas temperature based on input parameters, and the measured controlled variable contains information from the actually prevailing temperatures of the exhaust gas at the position of the temperature sensor. Both items of information together are used to set the manipulated variable. Accordingly, the manipulated variable and thus the control circuit as a whole can be set to operate altogether more aggressively/responsively/quickly, whereby the control circuit can set or perform closed-loop control of the temperature of the component as desired very reliably and quickly. Overall, the temperature of the component can be set very quickly and reliably with a control circuit using a method according to the present disclosure. In addition, it is possible to react quickly and reliably to disturbance variables or to other external influences that influence the closed-loop temperature control of the component.

In some implementations, the component is a particle filter which is arranged in the exhaust-gas tract of the internal combustion engine. The particle filter is a component that is operated at different temperatures. Accordingly, it is all the more important to perform closed-loop control of the temperature of the particle filter in the exhaust-gas tract. In some examples, for closed-loop control of the temperature of the particle filter in the exhaust-gas tract of the internal combustion engine, the temperature within the particle filter can advantageously be set or controlled in closed-loop fashion quickly and exactly, such that it is possible overall for the particle filter, throughout its operating duration, to be operated in its optimum temperature window in accordance with the operating phase.

In some implementations, the component is an exhaust-gas catalytic converter which is arranged in the exhaust-gas tract of the internal combustion engine. The exhaust-gas catalytic converter is arranged in the exhaust-gas tract in order to reduce and bind pollutants from the exhaust gas. For optimum operation of the exhaust-gas catalytic converter, it is necessary for the exhaust-gas catalytic converter to reach a certain operating temperature or be operated as far as possible within a certain operating window, such that the exhaust-gas catalytic converter can reduce the pollutants from the exhaust gas in an effective manner. For example, in the event of a cold start of the internal combustion engine, it is highly important to bring the exhaust-gas catalytic converter to the required operating temperature quickly such that the exhaust-gas catalytic converter can be operated in its optimum operating temperature window and the pollutants from the exhaust gas can be optimally reduced. In some examples, the temperature of the exhaust-gas catalytic converter in the exhaust-gas tract is set or controlled in closed-loop fashion advantageously quickly, such that the exhaust-gas catalytic converter can be brought to the desired operating temperature very quickly or does not depart from its temperature window. In some examples, the component is the exhaust-gas catalytic converter and the particle filter, such that the temperature of the exhaust-gas catalytic converter and of the particle filter is controlled in closed-loop fashion accordingly.

In some examples, the manipulated variable of the control circuit is a reserve torque of the internal combustion engine which is set by control of the ignition timing of individual cylinders of the internal combustion engine. As the present disclosure, the reserve torque is the manipulated variable of the control circuit. Accordingly, the reserve torque is set based on or on the basis of the modeled controlled variable and the measured controlled variable. In some examples, the reserve torque is set by the control of the ignition timing of individual cylinders of the internal combustion engine. The control of the ignition timing is based on the modeled controlled variable and the measured controlled variable of the control circuit. The ignition timing of the individual cylinders is a very precisely settable operating parameter of the internal combustion engine, such that the closed-loop control of the temperature of the component can be controlled in closed-loop fashion very precisely and quickly by the control of the ignition timing.

In some implementations, the modeled controlled variable is provided by the temperature model on the basis of at least one operating parameter of the internal combustion engine. In other words, one of the operating parameters of the internal combustion engine is input into the temperature model, whereby the modeled controlled variable is determined and provided to the control circuit.

In some examples, at least one of the operating parameters is a rotational speed of the internal combustion engine, a load of the internal combustion engine, a present ignition angle of the internal combustion engine, a lambda value of the internal combustion engine, an exhaust-gas mass flow rate of the internal combustion engine or a coolant temperature of the internal combustion engine. Other operating parameters of the internal combustion engine may additionally be provided to the temperature model. The abovementioned operating parameters of the internal combustion engine have a direct influence on the temperature of the component in the exhaust-gas tract. Accordingly, by taking these operating parameters into consideration, the modeled controlled variable can be derived from the temperature model in a very exactly modeled manner. In some examples, a large number of the abovementioned operating parameters plus possible additional parameters are fed to the temperature model, from which the modeled controlled variable is determined and provided to the control circuit.

In some implementations, the modeled controlled variable is additionally provided by the temperature model on the basis of at least one environmental parameter. In other words, at least one environmental parameter is simultaneously inputted for the determination of the modeled controlled variable. By virtue of the fact that the controlled variable is additionally set based on prevailing ambient conditions, the closed-loop control of the temperature of the component is additionally more exact and more reliable. In some examples, at least one of the environmental parameters is an ambient air temperature or an ambient air pressure. For example, the ambient air temperature has an influence on the temperature of the component both immediately after the cold start of the internal combustion engine and during the operation of the internal combustion engine. Accordingly, it is advantageous for the ambient air temperature and the ambient air pressure to be taken into consideration in the determination of the modeled controlled variable by the temperature model. In some examples, in the temperature model, the component temperature is equated with the exhaust-gas temperature.

In some implementations, the temperature model is a dynamic temperature model which dampens disturbance variables on the control circuit by a damping function. The dynamic temperature model differs from the temperature model in that additional parameters are taken into consideration. In some examples, the heat transfer from the exhaust gas to the component is taken into consideration in the dynamic temperature model. Here, the gradient of the heat transfer is described by the temperature gradient between the exhaust-gas temperature and the component temperature. Therefore, the component may have a higher heat capacity than the exhaust gas. The heat capacity influences the heating and cooling behavior of the component. This is taken into consideration in the dynamic temperature model.

In some implementations, the temperature model has a temperature model without dead time and has a temperature model with dead time. The dead time is the time period between the signal change from the system input and the signal response at the system output of the control circuit. The temperature model without dead time is that part of the temperature model which is not influenced, or is influenced only very little, by influences involving dead time. By contrast to this, the temperature model with dead time is that part of the temperature model which is influenced to a greater or lesser extent by influences involving dead time. By separating the temperature model without dead time and the temperature model with dead time, the influences may additionally be exactly assigned or clustered, whereby faster and more exact closed-loop control of the temperature of the component is additionally made possible. In some examples, the temperature model is a Smith predictor.

Another aspect of the disclosure provides a computer program product that has at least one computer-readable storage medium with program code instructions stored thereon, which program code instructions can be executed by a computer. The program code instructions that can be executed by the computer are configured to carry out the abovementioned method. The computer program product may, for example, be stored in an engine control unit of the internal combustion engine.

Yet another aspect of the disclosure provides a device for closed-loop control of a temperature of a component in an exhaust-gas tract of an internal combustion engine. The device has a control unit which is configured to control the abovementioned method. The device may be the engine control unit. It is also conceivable that the device is part of the engine control unit or is installed as an additional control unit, for example in a vehicle with the internal combustion engine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
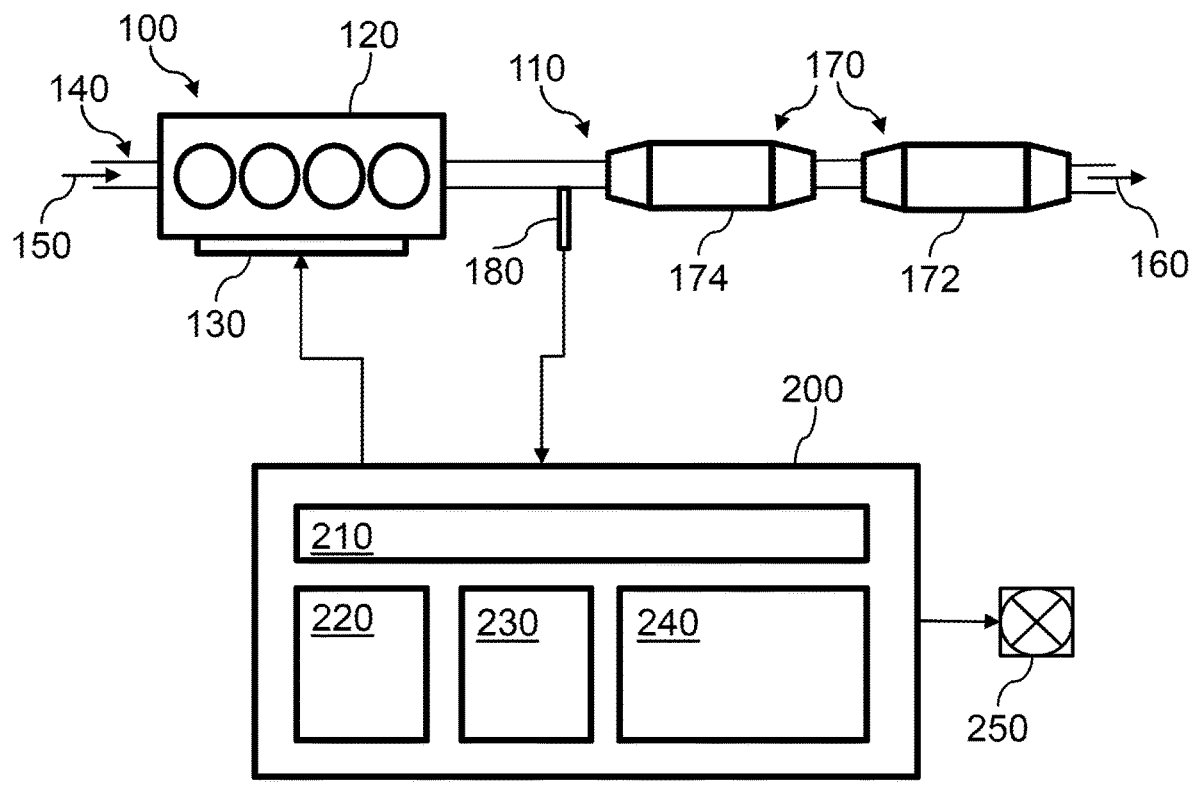
FIG. 1 is a schematic illustration of an internal combustion engine with an exhaust-gas tract and a control unit.

FIG. 1 is a schematic illustration of an internal combustion engine 100 with an exhaust-gas tract 110 which is designed to discharge the exhaust gas 160 from the internal combustion engine 100. The internal combustion engine 100 has an internal combustion engine block 120 and an ignition system 130. The ignition system 130 controls the ignition of the individual fuel-air mixtures in the cylinders of the internal combustion engine block 120. The internal combustion engine 100 additionally has an intake tract 140 which is designed to conduct intake air 150 into the internal combustion engine block 120. The exhaust-gas tract 110 discharges the exhaust gas 160 from the internal combustion engine block 120. According to FIG. 1, the exhaust-gas tract 110 has a particle filter 172 and an exhaust-gas catalytic converter 174. The exhaust-gas catalytic converter is arranged downstream of the internal combustion engine block 120. The particle filter 172 is arranged downstream of the exhaust-gas catalytic converter 174 in the exhaust-gas flow direction. The particle filter 172 and the exhaust-gas catalytic converter 174 are arranged as components 170 in the exhaust-gas tract 110. The exhaust-gas tract 110 additionally has a temperature sensor 180. The temperature sensor 180 is arranged in the exhaust-gas tract 110 upstream of the exhaust-gas catalytic converter 174 and downstream of the internal combustion engine block 120. The temperature sensor 180 is designed to detect a measurement signal 310 (FIG. 2), where the measurement signal 310 is characteristic of an exhaust-gas temperature 312 (FIG. 2) of the exhaust gas 160 of the internal combustion engine 100.

FIG. 1 also shows a control unit 200 having a processing unit 210, a data memory 220, a program memory 230 and a fault memory 240. The control unit 200 processes the measurement signal 310 from the temperature sensor 180. The control unit 200 is additionally designed to carry out the method according to the present disclosure and thereby perform closed-loop control of the temperature of the component 170 in the exhaust-gas tract 110 of the internal combustion engine 100. In this regard, required parameters may be stored in the data memory 220 of the control unit 200. A temperature model 320 (FIG. 2) may additionally be stored in the program memory 230 of the control unit 200. During the operation of the internal combustion engine 100, the processing unit 210 of the control unit 200 may use the measurement signal 310 from the temperature sensor 180 and use the temperature model 320 to determine a modeled controlled variable 340 (FIG. 2) and a measured controlled variable 330 (FIG. 2) and may provide these to a control circuit, from which controlled variables a manipulated variable 350 (FIG. 2) for the control circuit is determined, where the manipulated variable 350 is fed to the ignition system 130 of the internal combustion engine 100 in order to perform closed-loop control of the temperature of at least one of the components 170 in the exhaust-gas tract 110 of the internal combustion engine 100. Should a fault occur during the closed-loop control of the temperature of at least one of the components 170, this fault may be stored in the fault memory 240 of the control unit 200. In addition, a fault display device 250 may be activated in order to display the fault to a user of the internal combustion engine 100 or to a driver who is driving a vehicle with the internal combustion engine 100.

Figure 2:
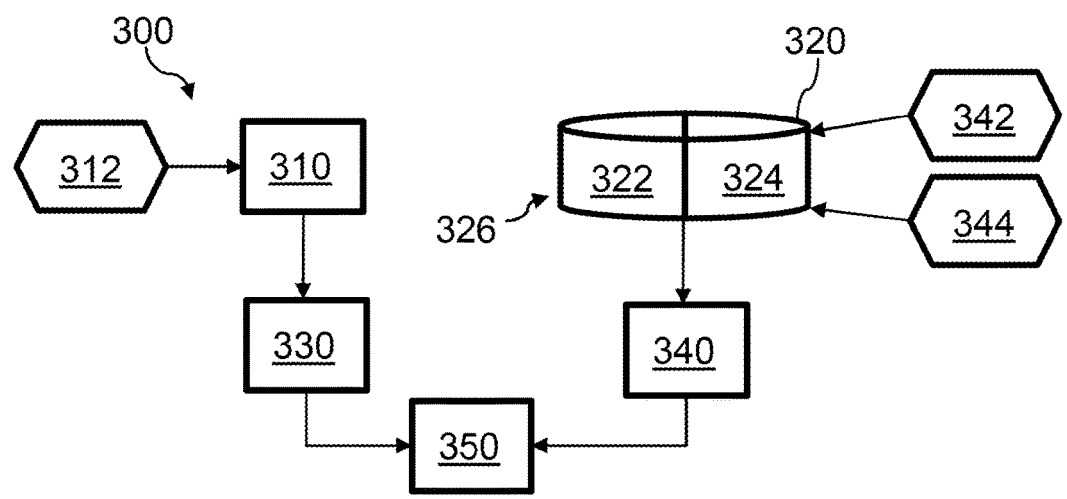
FIG. 2 shows a block diagram of a method for closed-loop control of a temperature of a component in an exhaust-gas tract of an internal combustion engine.

FIG. 2 shows a block diagram 300 of an example of a method executed on the control unit 200. According to the block diagram 300, a measurement signal 310 is provided which is characteristic of the exhaust-gas temperature 312. A measured controlled variable 330, which is used for the closed-loop control of the temperature of the component, is provided from the measurement signal 310. In addition, a temperature model 320 is provided. The temperature model 320 has a temperature model 322 without dead time and has a temperature model 324 with dead time. The temperature model 320 may be stored on the program memory 230 of the control unit 200. The temperature model 320 serves as a predictor 326 for the control circuit for the closed-loop control of the temperature of the component 170. Operating parameters 342 of the internal combustion engine 100 and environmental parameters 344 are input into the temperature model 320. By way of the temperature model 320 and the input data (operating parameters 342 and environmental parameters 344), a modeled controlled variable 340 is determined. The modeled controlled variable 340 is used for the closed-loop control of the temperature of the component 170. A manipulated variable 350 for the control circuit is determined from the modeled controlled variable 340 and the measured controlled variable 330. The manipulated variable 350 is transmitted to the ignition system 130 of the internal combustion engine 100, whereby the reserve torque is controlled by the ignition angle, whereby the temperature of the component 170 in the exhaust-gas tract 110 is controlled in closed-loop fashion.

A number of implementations have been described. Nevertheless, it will be understood that various modifications may be made without departing from the spirit and scope of the disclosure. Accordingly, other implementations are within the scope of the following claims.

What is claimed is:

1. A method for closed-loop control of a temperature of at least one component in an exhaust-gas tract of an internal combustion engine, the exhaust-gas tract has a temperature sensor arranged upstream of the at least one component in the exhaust-gas tract, the method includes:
providing a control circuit for the closed-loop control of a temperature of the at least one component;
detecting a measurement signal at the temperature sensor during operation of the internal combustion engine, the measurement signal is characteristic of an exhaust-gas temperature of an exhaust gas upstream of the at least one component, the measurement signal is used as a measured controlled variable for the control circuit for the closed-loop control of the temperature of the at least one component;
providing a temperature model for the exhaust-gas temperature of the exhaust gas, the temperature model is used as a predictor for the control circuit, and the temperature model provides a modeled controlled variable;
determining a manipulated variable of the control circuit for the closed-loop control of the temperature of the at least one component based on the modeled controlled variable and the measured controlled variable; and
transmitting the manipulated variable to an ignition system of the internal combustion engine causing the ignition system to control ignition of individual fuel-air mixtures in cylinders of the internal combustion engine and to control the temperature of the at least one component by way of the closed-loop control, the manipulated variable of the control circuit is a reserve torque of the internal combustion engine which is set by control of the ignition timing of individual cylinders of the internal combustion engine;
storing a fault in a fault memory when the fault occurs during the closed-loop control of the temperature of the at least one component occurs,
wherein the at least one component includes a particle filter or an exhaust catalytic converter.

2. The method of claim 1, wherein the modeled controlled variable is provided by the temperature model based on at least one operating parameter of the internal combustion engine.

3. The method of claim 2, wherein at least one of the operating parameters is a rotational speed of the internal combustion engine, a load of the internal combustion engine, an ignition angle of the internal combustion engine, a lambda value of the internal combustion engine, an exhaust-gas mass flow rate of the internal combustion engine or a coolant temperature of the internal combustion engine.

4. The method of claim 2, wherein the modeled controlled variable is additionally provided by the temperature model based on at least one environmental parameter.

5. The method of claim 4, wherein at least one of the environmental parameters is an ambient air temperature or an ambient air pressure.

6. The method of claim 1, wherein the temperature model is a dynamic temperature model which dampens disturbance variables on the control circuit by a damping function.

7. The method of claim 1, wherein the temperature model has a temperature model without dead time and has a temperature model with dead time.

8. A device for closed-loop control of a temperature of at least one component in an exhaust-gas tract of an internal combustion engine, the device comprising:
a control unit configured to execute the following:
detecting a measurement signal at a temperature sensor during operation of the internal combustion engine, the temperature sensor arranged upstream of the at least one component in the exhaust-gas tract,
the measurement signal is characteristic of an exhaust-gas temperature of an exhaust gas upstream of the at least one component, the measurement signal is used as a measured controlled variable for a control circuit for the closed-loop control of the temperature of the at least one component;
providing a temperature model for the exhaust-gas temperature of the exhaust gas, the temperature model is used as a predictor for the control circuit, and the temperature model provides a modeled controlled variable;

determining a manipulated variable of the control circuit for the closed-loop control of the temperature of the at least one component based on the modeled controlled variable and the measured controlled variable;

transmitting the manipulated variable to an ignition system of the internal combustion engine causing the ignition system to control ignition of individual fuel-air mixtures in cylinders of the internal combustion engine and to control the temperature of the at least one component by way of the closed-loop control, the manipulated variable of the control circuit is a reserve torque of the internal combustion engine which is set by control of the ignition timing of individual cylinders of the internal combustion engine;

storing a fault in a fault memory when the fault occurs during the closed-loop control of the temperature of the at least one component occurs, wherein the at least one component includes a particle filter or an exhaust catalytic converter.

9. The device of claim 8, wherein the modeled controlled variable is provided by the temperature model based on at least one operating parameter of the internal combustion engine.

10. The device of claim 9, wherein at least one of the operating parameters is a rotational speed of the internal combustion engine, a load of the internal combustion engine, an ignition angle of the internal combustion engine, a lambda value of the internal combustion engine, an exhaust-gas mass flow rate of the internal combustion engine or a coolant temperature of the internal combustion engine.

11. The device of claim 9, wherein the modeled controlled variable is additionally provided by the temperature model on the basis of at least one environmental parameter.

12. The device of claim 11, wherein at least one of the environmental parameters is an ambient air temperature or an ambient air pressure.

13. The device of claim 8, wherein the temperature model is a dynamic temperature model which dampens disturbance variables on the control circuit by a damping function.

14. The device of claim 8, wherein the temperature model has a temperature model without dead time and has a temperature model with dead time.

* * * * *